United States Patent [19]

Hanchard et al.

[11] 4,309,080
[45] Jan. 5, 1982

[54] VARIABLE FLUID MEDIA RADIATION FILTER

[76] Inventors: Jean-Pierre Hanchard, 7, rue Rivelaine, B1428, Lillois; Charles Servais, 24 rue Forgeur, 400, Liege, both of Belgium

[21] Appl. No.: 118,734

[22] Filed: Feb. 5, 1980

[30] Foreign Application Priority Data

Feb. 6, 1979 [BE] Belgium .................................. 193295

[51] Int. Cl.³ ............................................. G02B 5/24
[52] U.S. Cl. ..................................................... 350/312
[58] Field of Search ............... 350/312, 315, 318, 267, 350/258, 260

[56] References Cited

U.S. PATENT DOCUMENTS

| | | | |
|---|---|---|---|
| 2,378,591 | 6/1945 | Solis | 350/312 |
| 2,537,011 | 1/1951 | Aparicio | 350/312 |
| 3,711,189 | 1/1973 | Novotny et al. | 350/312 |
| 4,236,360 | 12/1980 | Parrier et al. | 350/312 |

*Primary Examiner*—John K. Corbin
*Assistant Examiner*—Bruce Y. Arnold
*Attorney, Agent, or Firm*—Squire, Sanders & Dempsey

[57] ABSTRACT

A variable fluid media radiation filter apparatus comprised of a pair of spaced, opposing panes transmissive to radiation, sealed at their opposing edges so as to form a cavity therebetween in communication with a pair of sealed, fluid-retaining, upper and lower bellows forming, with the cavity, a closed volume containing a plurality of immiscible fluids of differing specific gravities and radiative transmissivities, whereby the fluid within the cavity may be changed by selectively compressing or expanding the bellows, thereby changing the radiation transmission characteristics of the filter.

16 Claims, 2 Drawing Figures

VARIABLE FLUID MEDIA RADIATION FILTER

FIELD OF THE INVENTION

This invention relates to variable density radiation filters, such as are used in windows to screen or filter out undesired visible and invisible solar radiation.

BACKGROUND OF THE INVENTION

Optical filter devices used as windows and containing a fluid as the filter medium are well known. U.S. Pat. No. 192,843 (Sloan) disclosed a simple window structure capable of being filled with a tinted liquid. Other structures for vehicle and building windows into which a filtering liquid may be introduced or withdrawn through conduits, valving, pumping and other hydraulic means have been disclosed in U.S. Pat. Nos. 2,378,591 (Solis), 2,439,553 (Winn, aircraft windows), 3,174,398 (Brauner, automobile windows), 3,724,929 (Lacy, automobile windows), and 4,093,352 (Pisar). Other inventions have described additional applications of the fluid media light filtering devices and means for introducing and withdrawing the fluid; for examples, see U.S. Pat. Nos. 2,501,418 (Snowden, fluid flow activated by heating and cooling) and 3,674,344 (Lacy, motorcycle helmet and goggles, fluid flow by gravity). Some disclosures such as U.S. Pat. No. 3,724,929 (Lacy) have provided for the use of multiple immiscible liquids of differing specific gravities so that the filtering liquid may be selectively changed from one transmissivity to another. Still other less closely related inventions, of which U.S. Pat. No. 3,711,189 (Novotny) is an example, use the principle of internal reflection at a junction of materials of differing indices of refraction, to construct filters having selectably opaque and translucent states. More esoteric methods of darkening windows in the presence of solar radiation have been disclosed in French Pat. No. 1,584,280 (photochromic materials) and Belgian Pat. No. 677,236 (polarized photo-conductors).

Prior inventions, especially those using multiple immiscible filtering liquids, have suffered from a number of disadvantages. Those devices containing a conventional fluid pumping means suffer from interphase mixing brought about by the turbulent stirring action of a pump. Conventionally pumped system devices containing gaseous fluids also have the disadvantage of inducing gas bubbles in the fluid during pumping. In the art, it is preferable that the volume of the fluid media and, consequently, the filter cavity be kept relatively small. As a result, variations of media and filter temperature can have a dramatic effect on the cavity volume and the pressure of the fluid within it. For that reason, prior art inventions generally include an elaborate check valve-pressure relief valve system or an auxiliary reservoir to hold overflowing fluid, making those inventions relatively costly and complex.

SUMMARY OF THE INVENTION

An object of the present invention is to provide a radiation filter capable of filtering light and other electromagnetic radiation through a selected portion of fluid filtering media.

Another object of the present invention is to provide an improved means in a variable fluid media radiation filter for selectably changing from one or more fluid filtering media to another medium or media.

A further object of the invention is to provide an improved variable fluid radiation filter having filtering media retained in a closed volume permitting expansion and contraction of the media and its retaining walls with variations in temperature or other ambient conditions.

Still another object of the present invention is to provide a self-contained variable optical density window assembly that will readily fit within an ordinary building frame and building frame-receiving opening.

A general object of the invention is to provide an improved variable fluid media radiation filter which is efficient and effective in use and which can be manufactured in an economical and practical manner.

The objects of the invention are achieved according to the preferred embodiment by the use of a pair of opposing, spaced transmissive panes or members, sealed along opposing edges so as to define a cavity therebetween. One pair of the opposing ends of the members is elevated with respect to the other pair of opposing ends. The members are sealed at the opposing ends so as to be in communication through fluid transmissive means to two closed bellows, one bellows connected at each of said ends so that a closed volume is formed by the cavity and pair of bellows. A plurality of immiscible fluids of differing specific gravities and radiation transmissive characteristics fill the closed volume, the particular fluid or fluids within the cavity being determined at a particular time by the respective states of expansion or compression of the pair of bellows. The fluid or fluids in the cavity may be selected from amongst those within the closed volume by means for altering the relative states of expansion and compression of the pair of bellows. Changing the fluid within the cavity changes the filtering effect of the assembly on the radiation incident on the transmissive members. Bellows actuating means control the selective expansion or contraction of the bellows, and the bellows can be automatically adjusted by changes in ambient conditions.

The objects of the invention are thereby achieved by a simple closed volume apparatus containing fluid filtering media, with means for selectably changing the media within the filtering cavity. Because the means of changing media does not involve turbulent stirring, bubble formation in the media is minimized when gaseous filter media are employed. The closed expandable volume accommodates ambient changes without check valving or a separate overflow reservoir.

DETAILED DESCRIPTION OF PREFERRED EMBODIMENT

Figure 1:
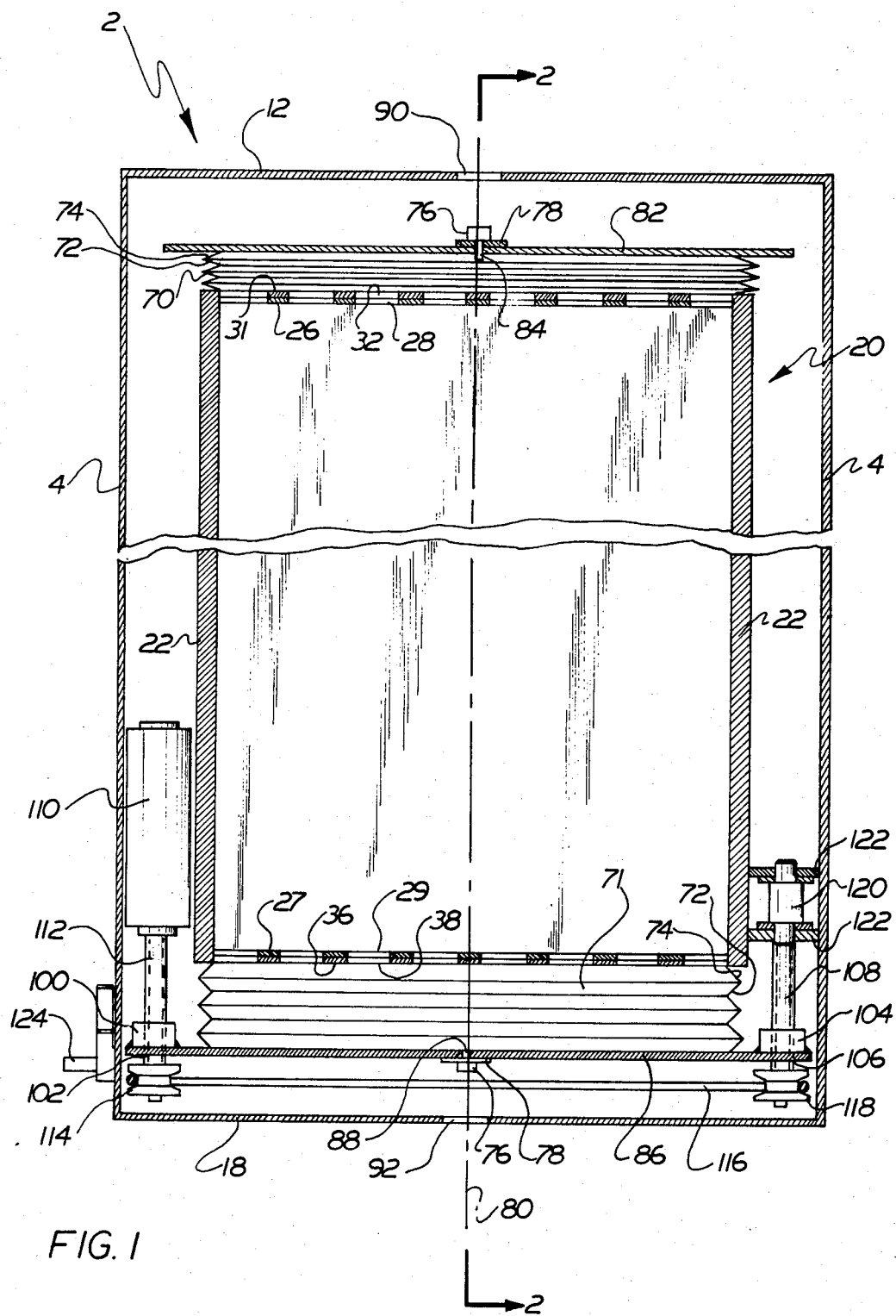
FIG. 1 is a fragmentary front view of the invention according to the preferred embodiment.
Figure 2:
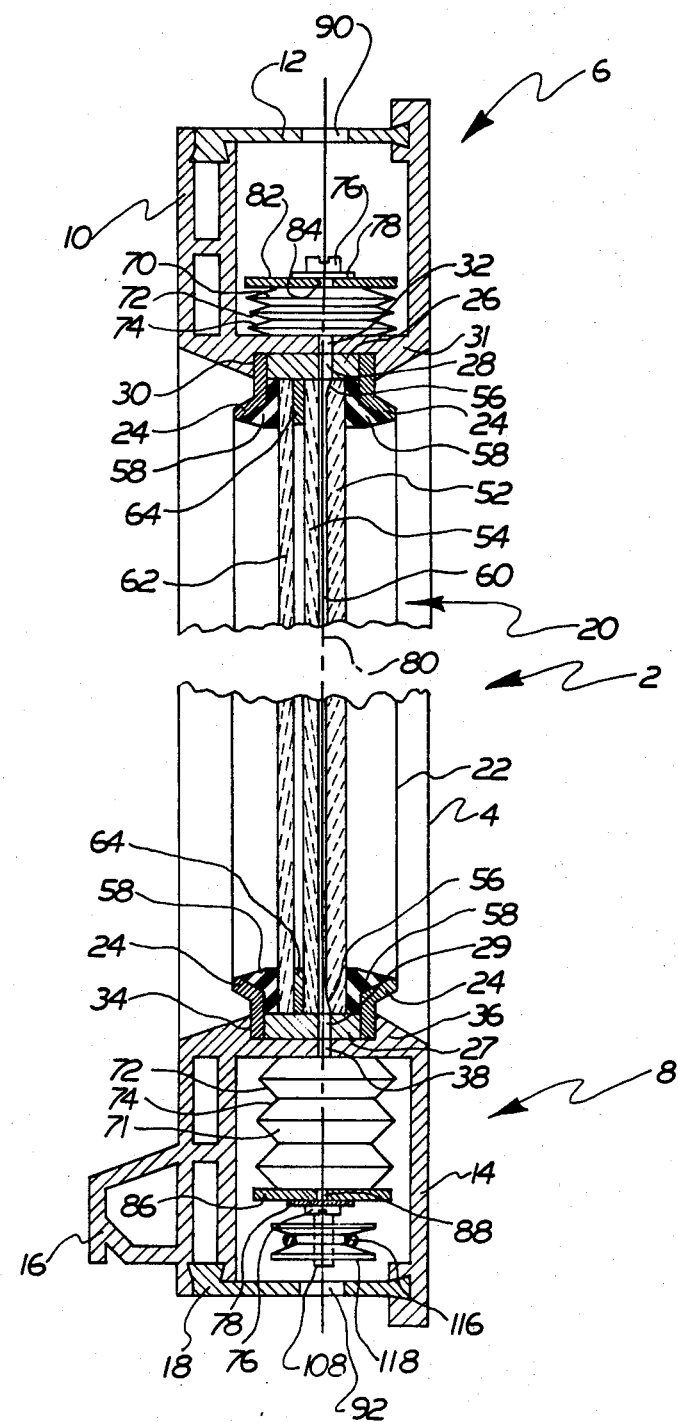
FIG. 2 is a cross-sectional view taken on line 2—2 of FIG. 1 showing the invention according to the preferred embodiment.

The preferred embodiment of the invention is a variable fluid light filtering window apparatus. FIG. 1 shows a front view of the window assembly with the obscuring parts of the frame removed so as to reveal the operating parts of the assembly. FIG. 2 further reveals the assembly structure in cross section taken along the line 2—2 as shown in FIG. 1. Identical components appearing in multiple locations in the assembly are designated by identical numbers. Both drawings must be simultaneously referenced to understand the operation of the filter apparatus.

The entire window apparatus is shown in the figures including a window frame 2 having sidewalls 4, and upper and lower hollow box-like enclosures 6 and 8, respectively. Upper enclosure 6 is comprised of a channel 10 open at the top adapted to receive a top cover 12. Lower enclosure 8 is comprised of a channel 14 open at the bottom to which a sill 16 is attached. Channel 14 is adapted to receive bottom cover 18.

Fitted within frame 2 is a subframe 20, comprising sidewalls 22 and similar, preferably identical, upper and lower members comprised of outwardly flared front and rear horizontal side strips 24 and upper and lower fluid transmission means 26 and 27 containing apertures 28 and 29, respectively. Upper fluid transmission means 26 is clamped front and rear by side strips 24, the entire subassembly being fitted into and sealed to a groove 30 on the outside of a bottom section 31 of channel 10. Section 31 has apertures 32 similar to apertures 28 in upper fluid transmission means 26, and the apertures 28 and 32 are aligned when subframe 20 is fitted within frame 2. Similarly, the lower fluid transmission plate 27 is clamped front and rear by side strips 24, the entire subassembly being fitted into and sealed to a groove 34 on the outside of a top section 36 of channel 14. Section 36 has apertures 38 similar to apertures 29 in lower fluid transmission means 27, and the apertures 29 and 38 are aligned when subframe 20 is fitted within frame 2.

Within subframe 20 are sealed two opposed radiative transmissive members or panes 52, 54 separated by a distance so that a cavity 60 between the panes is formed. Panes 52 and 54 are fitted within subframe 20 so that cavity 60 is in communication through apertures 28 and 32 with the interior of enclosure 6 and through apertures 29 and 38 with the interior of enclosure 8. Pane 52 has bevels 56 at its upper and lower ends to adapt cavity 60, which is of narrower width than apertures 28 and 29, to the width of apertures 28 and 29. A third opposing radiative transmissive member 62 separated from pane 54 by a spacer 64 is also fitted within subframe 20. Panes 62 and 52 are sealed at their ends to side strips 24 and to fluid transmission means 26 and 27 and along their edges to sidewalls 22 by an elastic sealant 58, preferably silicone rubber.

Within enclosures 6 and 8, respectively, are elongated bellows 70 and 71. Each bellows comprises a tube of oblong cross section with alternately inwardly and outwardly folded accordion-like pleated sides 72 and 74, so that each bellows may be repetitively and non-destructively extended and compressed along its longitudinal axis 80. The major cross-sectional axis of bellows 70 and 71 is of sufficient length to span apertures 28 and 29, respectively. Bellows 70 is located in enclosure 6 so as to span apertures 28 and 32 and is sealed along its lower peripheral edge to the inside of section 31 of channel 10. Bellows 71 is disposed in enclosure 8 so as to span apertures 29 and 38, and is sealed along its upper peripheral edge to the inside of section 36 of channel 14. Thus the bellows structures 70 and 71 are in communication with cavity 60 through apertures 28 and 32, and 29 and 38 respectively. Bellows 70 is sealed at its upper peripheral edge to a generally rigid closure 82 containing a central hole 84 that may be sealed by a stopper 67 and washer 78. Bellows 71 is sealed at its lower peripheral edge to a generally rigid closure 86 containing a central hole 88 that may be sealed by a stopper 76 and washer 78. Access to stoppers 76 from outside frame 2 is obtained through holes 90, 92 in top cover 12 and bottom cover 18, respectively, of frame 2. The closed, stoppered bellows 70, 71, apertures 28, 32, 29 and 38 and cavity 60 thus form a closed volume.

Closure 86 extends laterally beyond the ends of bellows 71, having at each extended end a hole 102, 106 and a coaxially mounted collar 100, 104. A reversible electric motor 110 is mounted within frame 2 and outside subframe 20, between one sidewall 4 and an adjacent sidewall 22. The motor is fitted with a shaft 112 passing through section 36 of channel 14, engaging collar 100, extending through hole 102, and terminating in a pulley 114. At the opposite side of frame 2 and between adjacent sidewalls 4 and 22 are attached mountings 122 retaining a bearing 120 through which passes a shaft 108, preferably parallel to shaft 112. Shaft 108 passes through section 36 of channel 14, engaging collar 104, extending through hole 106 and terminating in pulley 118 aligned with pulley 114. A belt 116 connects pulleys 114 and 118. Electrical energy is supplied to motor 110 through a connector 124 mounted on sidewall 4 as an integral part of frame 2.

In operation, the closed volume comprising cavity 60, bellows 70 and apertures 28, 29, 32 and 38, is filled with two or more immiscible fluids of varying radiative transmissivities. I prefer to fill the closed volume by removing stopper 76 in closure 82 and fully comprising lower bellows 71. Bellows 71 is compressed by applying electricity through connector 124 to actuate reversible motor 110 so that shaft 112 is turned in collar 100, and shaft 108, through the intermediacy of pulleys 114, 118 and belt 116, is synchronously turned in collar 104, thereby raising closure 86 while maintaining closure 86 generally horizontal. The filtering fluid with the greatest specific gravity is then introduced into the closed volume through hole 84 until cavity 60 is filled to the desired level. In many applications, enough fluid will be introduced to fill cavity 60 to or just slightly beyond upper fluid transmission means 26. However, it may be desired that the fluid not be capable of totally filling cavity 60. In that event, only so much fluid is introduced in cavity 60 as is desired. Motor 110 is then actuated turning shafts 108, 112 to lower closure 86, thereby expanding bellows 71 so that fluid within cavity 60 is drained into bellows 71. The motor is stopped when the desired amount of fluid has drained and the filtering fluid with the second largest specific gravity is introduced in the desired quantity through hole 84. Any additional fluid filtering media, immiscible in the others can be added successively in the same manner, i.e., by successively draining fluid from cavity 60 and introducing the next fluid. Among the fluids that may be used as filtering media are pure gases, gaseous mixtures such as air, tinted and untinted liquids such as water, mineral oils, halogenated aliphatic compounds and other stable, preferably non-hazardous fluids well known to those skilled in the art. If it is desired to exclude air or any gas as a fluid medium, bellows 71 is adjusted after the introduction of the final fluid filtering medium, so that hole 84 is filled with the final liquid medium before sealing with stopper 76 and washer 78. The number of fluid media that may be used in a filter apparatus is limited solely by the capacities of the bellows 70, 71 and the volume of cavity 60. For a window 1.7 meters by 1.0 meters with a separation of 0.5 millimeters between transmissive members 52, 54, a bellows capacity of about 0.85 liters is required for each fluid medium. The size of bellows 70, 71 is theoretically unlimited, although for the embodiment I prefer, I restrict the size of bellows 70, 71 to fit within enclosures 6 and 8, respectively.

The radiative transmission characteristics of the filter are determined by the transmissivity of transmissive members 52, 54 and 62 and of the filter medium or media filling cavity 60. Transmissive member 62 is inserted in subframe 20 primarily to add mechanical strength and thermal and acoustical insulation. In use, the preferred embodiment is intended to be installed in a building window so that incident radiation first passes through pane 62. I prefer panes 52, 54 and 62 have very high transmissivity so that when air is used as a filtering medium, apparatus 2 acts as an ordinary window. However, any or all of transmissive members 52, 54 or 62 may have reduced transmissivity which in concert with a fluid medium in cavity 60 will provide a total filtering effect. The maximum transmissivity of apparatus 2 is limited by the transmissivity of members 52, 54 and 62.

In the preferred embodiment, the medium within cavity 60 is changed by compressing or expanding bellows 71 through the use of the fluid driving means comprising motor 110, pulleys 114 and 118, belt 116, collars 100 and 104 and shafts 108 and 112. A fluid filtering medium of greater specific gravity is introduced into cavity 60 by compressing bellows 71. Bellows 71 is compressed by actuating the fluid driving means so that motor 110 through the intermediacy of pulleys 114 and 118, belt 116, collars 100 and 104 and shafts 108 and 112 raises closure 86. Raising closure 86 reduces the volume of bellows 71 forcing fluid to flow from it through apertures 38 in section 36 of channel 14 and apertures 38 in lower fluid transmission means 27 into cavity 60. Lower specific gravity fluid within cavity 60 is in turn forced to flow from cavity 60 through apertures 28 in upper fluid transmission means 26 and apertures 32 in section 31 of channel 10 into bellows 70. In response to the flow, bellows 70 expands to accept the infusion of fluid. The process is reversed if it is desired to place lower specific gravity fluid in cavity 60, so that closure 86 is lowered by the fluid driving means, fluid within cavity 60 drains into expanded bellows 71 and lighter filtering fluid drains from bellows 70 into cavity 60. Actuation of motor 110 in the desired direction (compressing or expanding bellows 71) for as long as necessary permits the selection of the desired filter medium or media from those present in the closed volume for use in cavity 60 to produce the desired radiation filtering effect. By limiting the rate at which closure 86 is raised or lowered, the flows into and out of cavity 60 remain essentially laminar so that little stirring or intermixing of the filter media occurs and few air bubbles are formed even when one of the filtering media is a gas or gaseous mixture. I prefer that motor 110 provide the motive force for the fluid driving means because two or more electrically actuated frames may be simultaneously actuated remotely. However, a hand-actuated crank or similar manual mechanical arrangement may be substituted for motor 110 with equivalent results for a single frame.

Bellows 70 expands or contracts in response to the actuation of the fluid driving means and to other forces including changes in ambient conditions such as temperature and pressure. If temperature of the filtering media within the closed volume increases causing expansion of the media, the closed volume simply increases in volume by the expansion of bellows 70 to accommodate the change. Likewise, contraction of media are accommodated, so that no overflow reservoir or check valve system is required to compensate for ambient condition changes.

The invention thus described provides an improved variable fluid media radiation filter in which the filter media are contained in a closed, but variable, volume. The medium or media filtering the incident radiation are selectably chosen by compressing or expanding variable volume reservoirs, thereby forcing a selected medium or media into the path of the incident radiation. A plurality of immiscible filtering media, including a gas or gaseous mixture, may be employed with only two reservoirs without undesirable bubble formation, or an overflow reservoir or check valve system to accommodate expansion and contraction of the media. The filter may be constructed economically and compactly and, in the preferred embodiment described, fit entirely within a building window frame for practical and economic use.

The specific embodiment shown and described is but one means of accomplishing the invention shown and it should be understood that those skilled in the art may devise various omissions, substitutions and modifications without departing from the spirit of the invention. Accordingly, it is intended that the scope of the present invention be limited solely by the following claims.

We claim:

1. A variable fluid media radiation filter apparatus comprising:
   a pair of opposing, spaced, radiation transmissive members, said members having opposing edge portions, and first and second opposing ends, said first end being elevated with respect to said second end;
   sealing means sealing said opposing edge portions, said opposing members and said sealing means defining a cavity;
   first and second bellows means being compressible and expandable so as to have variable volumes;
   fluid transmission means at each of said first and second opposite ends of said members interconnecting said first and second bellows means with said first and second opposite ends, respectively, said fluid transmission means rendering said first and second bellows in communication with said cavity, said first and second bellows, said transmission means and said cavity defining a closed volume;
   a plurality of immiscible fluids of different specific gravities and radiation transmission characteristics, said fluids filling said closed volume, the fluids within said cavity and said radiation transmissive members forming a radiation filter; and
   bellows actuating means for selectively compressing one of said first and second bellows means and expanding the other of said bellows means to force a portion of said fluids into and out of said cavity, to vary the filtering effect of said radiation filter on radiation incident on said filter.

2. The invention according to claim 1 including a third radiation transmissive member opposed to and spaced from said pair of opposing members to provide mechanical support and insulation to said pair of transmissive members.

3. The invention according to claim 1 wherein the transmissive members comprise panes for transmission of solar radiation.

4. The invention according to claim 1 wherein the transmissive members comprise flat parallel, generally vertical panes.

5. The invention according to claim 1 wherein the sealing means comprises a frame and an elastic sealant.

6. The invention according to claim 1 wherein said first and second bellows each include a removable stopper means through which fluids may be introduced into and abstracted from said closed volume.

7. The invention according to claim 1 wherein the fluid transmission means comprises first and second apertured members extending across the opposite ends of said pair of radiation transmissive members.

8. The invention according to claim 1 wherein said bellows actuating means includes a generally rigid closure attached to at least one bellows for applying forces to compress and expand said bellows.

9. The invention according to claim 8 wherein said bellows actuating means further comprises electric motor and force transmitting means for transmitting said motor's forces to said bellows.

10. The invention according to claim 9 wherein the transmitting means comprises:
a shaft on said motor, said shaft engaging said closure;
a first pulley attached to said shaft;
a second shaft engaging said closure;
a second pulley attached to said second shaft;
a belt for transmitting the rotation of said first shaft and pulley to said second shaft and pulley to move through said shaft engagements, said closure thereby applying compressing or expanding said bellows.

11. The invention according to claim 9 and further including an integral electrical connector electrically connected to said motor, whereby electrical energy is supplied to said electric motor through said connector.

12. The invention according to claim 1 wherein said fluids include at least one gas and at least one liquid.

13. The invention according to claim 1 wherein said fluids comprise a plurality of liquids.

14. The invention according to claim 1 wherein at least one of said fluids is transparent to said radiation.

15. The invention according to claim 1 wherein at least one of said fluids is opaque to said radiation.

16. The invention according to claim 1 wherein the filter apparatus comprises a window, said pair of radiation transmissive members comprise transparent panes, and said sealing means comprise a first frame mounted within a larger, second frame having hollow upper and lower enclosures within which said first and second bellows, respectively, are located.

* * * * *